3,265,661
2,4,6-TRIS(3,5-DI-TERT BUTYL-4-HYDROXYBENZ-YL) PHENYL ALKANOATES AND POLYPROPYL-ENE COMPOSITIONS STABILIZED THEREWITH
Albert L. Rocklin, Walnut Creek, Calif., assignor to Shell Oil Company, New York, N.Y., a corporation of Delaware
No Drawing. Filed Apr. 19, 1962, Ser. No. 188,843
4 Claims. (Cl. 260—45.85)

This invention relates to novel esters of polyphenols and to stabilized compositions containing them. More particularly, it relates to certain alkanoates of hydroxybenzyl-substituted phenols and to stabilized organic compositions, particularly polymeric compositions, containing them.

Alkylated phenols, such 2,6 - di - tert - butyl-p-cresol, are well known for stabilizing organic materials against the deleterious effects of oxidation. Particularly important substrates are organic polymeric materials, motor fuels and lubricants and foodstuffs. For applications where the organic material containing the stabilizer is exposed to high temperatures, as in the preparation or use, the phenolic antioxidants are somewhat volatile, and tend to evaporate out of the substrate, leaving the residual composition less resistant to oxidation. Furthermore, in certain colorless substrates, such as plastics, some stabilizers add undesirable color to the stablized system.

It is an object of this invention to provide a new and useful class of polyphenolic compounds, useful as stabilizers for organic materials normally subject to oxidative deterioration. Selectively esterified polyphenols having reduced volatility in organic compositions are yet another object of the invention, as are novel non-discoloring esters and plastic compositions containing them. A further object of the inventon is the provision of useful organic compositions stabilized with such phenolic compounds. The preparation of such polyphenolic compounds is yet another object. Other objects will be apparent from the following detailed description of the invention.

These objects are accomplished in the invention by the monoester of a mononuclear phenol, said phenol having at least one 3,5-dialkyl-4-hydroxybenzyl substituent attached to one of the carbon atoms ortho and para to the hydroxyl group.

The esters of the substituted phenols described are those of the structure

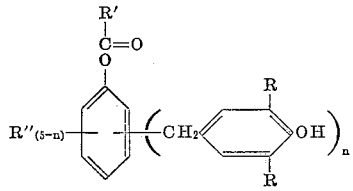

where each R is an alkyl group, preferably of up to 8 carbon atoms, R' is an aliphatic hydrocarbon radical, preferably of up to 8 carbon atoms, and R" is selected from the hydrogen atom and alkyl radicals of up to 8 carbon atoms, preferably lower normal alkyl, and $n$ is an integer from 1 to 3, the hydroxybenzyl substituent being connected to one of the carbon atoms ortho and para to the phenolic oxygen on the esterified phenol nucleus. In the preferred embodiment of the invention, at least one of the alkyl groups R is branched on the alpha carbon atom, while in the most preferred embodiment each of the alkyl groups R is so branched.

By virtue of their possession of at least one hindered phenolic group these compounds have been found to be superior antioxidants. They are also readily compatible with such organic materials as rubber, both natural and synthetic fuels, including gasoline and fuel oil, and lubricants, such as motor oils and petroleum-based greases.

Representative esters include 2-(3,5-diisopropyl-4-hydroxybenzyl)phenyl acetate; 4-(3,5-di-tert-butyl-4-hydroxybenzyl)phenyl formate; 2,4-di(3,5-di-tert-amyl-4-hydroxybenzyl)phenyl propionate; 2,6-di(3-methyl-5-isopropyl-4-hydroxybenzyl)phenyl butyrate; 3-methyl-6-(3,5-di-sec-butyl-4-hydroxybenzyl)phenyl octanoate; 2,4,6-tri(3,5-di-tert-hexyl-4-hydroxybenzyl)phenyl pentonate; 3,5-dimethyl-2,4,6-tri(3,5 - di-tert-butyl-4-hydroxybenzyl) phenyl acetate; 2-methyl-6-(3,5-diisopropyl - 4 - hydroxybenzyl)phenyl heptanoate; and 2,6-di-tert-butyl-4-(3,5-di-tert-amyl - 4 - hydroxybenzyl)phenyl formate. The preferred acid moieties are those of monocarboxylic hydrocarbon alkanoic acids of up to 8 carbon atoms, and preferably of lower alkanoic acids having up to 4 carbon atoms.

However, the acid moiety may also be that of a monocarboxylic hydrocarbon monoolefinic acid of the same number of carbon atoms; exemplary esters include 2,6-di-(3,5-di-tert-amyl-4-hydroxybenzyl)phenyl acrylate; 2,4,6-tri(3,5 - diisopropyl - 4 - hydroxybenzyl)phenyl crotonate; and 2 - tert-butyl - 6 - (3,5-di-sec-amyl-4-hydroxybenzyl) phenyl methacrylate.

These compounds may be best understood by consideration of the manner in which they are prepared. Most conveniently, they are synthesized by reacting together in liquid phase a mononuclear phenol having at least one 3,5-dialkyl-4-hydroxybenzyl substituent attached to one of the ring carbon atoms ortho and para to the hydroxyl group, with the anhydride of an aliphatic hydrocarbon monocarboxylic acid.

It will be readily understood by a consideration of the foregoing that the phenolic reactant is one having a reactive hydroxyl group on the phenolic nucleus and at least one non-reactive hindered hydroxyl group, said non-reactive hydroxyl being disposed on each benzylic nucleus. Such phenols are those of the structure

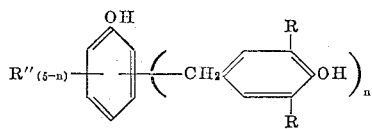

where R, R" and $n$ have the above meaning.

Typical phenols include 2-(3,5-di-tert-butyl-4-hydroxybenzyl)methylphenol; 2,6-di(3,5-diisopropyl-4-hydroxybenzyl)phenol; 2 - ethyl - 4 - (3,5-di-tert-amyl-4-hydroxybenzyl)phenol; 4 - (3 - methyl - 5 - tert-hexyl-4-hydroxybenzyl)phenol; 3,5-dimethyl-6-(3,5-diisopropyl-4-hydroxybenzyl)phenol; and 2,4,6-tris(3,5-di-tert-butyl-4-hydroxybenzyl)phenol. Preferred phenols are those in which each of the alkyl groups R on the benzyl nucleus is branched on the alpha carbon atom. These compounds are so structured that the benzylic hydroxyl group is so sterically hindered that it is far less reactive than the hydroxyl group on the phenol nucleus.

Because of this particular structure, the phenols may be selectively esterified by the process of the invention to afford products having both ester and hindered phenol functions. Suprisingly, such products have been found to be superior as stabilizers to the corresponding non-esterified polyphenols.

The phenol of this structure is reacted in liquid phase with the anhydride of an aliphatic monocarboxylic hydrocarbon acid. Such acids are those of the structure R'—COOH where R' is hydrocarbon, preferably up to 8 carbon atoms. Exemplary anhydrides include those of the monocarboxylic alkanoic acids, such as acetic anhydride, propionic anhydride, butyric anhydride, isobutyric anhydride, 2-ethyl butyric anhydride, 2-ethyl hexoic anhydride, and the like. Although the anhydrides of monocarboxylic alkanoic acids are the preferred reactants, those of monocarboxylic alkenoic acids are also effective. Representative of such anhydrides are acrylic anhydride, methacrylic anhydride and crotonic anhydride.

The phenol and anhydride are reacted together in liquid phase, preferably in solution in an inert organic liquid. Suitable solvents include aliphatic and cyclic ethers, e.g., dimethyl ether, diethyl ether, diisopropyl ether, and the like, or dioxane, dioxolane, furane, tetrahydrofurane, etc. While any ratio of reactants may be employed, the preferred ratio extends from a stoichiometric amount, e.g., one mole of anhydride per mole of phenol, to a substantial excess of the anhydride, preferably up to about ten moles of anhydride per mole of phenol. If desired, a catalytic amount of strong acid may be included in the system; suitable catalysts include the mineral acids, e.g., sulfuric or phosphoric acid, and the organic sulfo acids, e.g., p-toluenesulfonic acid. The esterification reaction may be conducted at any convenient temperature from about 0° C. to about the reflux temperature of the reaction system, temperatures up to about 100° C. being preferred.

The preparation of the esters in the invention may be conducted in such other alternative methods as are known to one skilled in the art. For example, the esterification may be carried out with the acid R'COOH instead of the anhydride thereof. The esters may also be prepared by ester exchange procedures.

The esters, once prepared, may readily be separated from the reaction system by stripping off the solvent and unreacted materials and recovering the residual product. Such other well-known separation methods as crystallization, extraction, fractional distillation and the like, may also be employed. The esters may then be finished, if necessary, to render them suitable for particular uses by appropriate methods including washing, recrystallization or clarification.

The resulting ester products are light-colored or white crystalline solids. They are particularly useful for the preparation of stabilized compositions consisting essentially of an organic material normally subject to oxidative deterioration, in which they are incorporated in an amount sufficient to stabilize the composition against oxidation. Because of their superior thermal stabilizing properties and extremely low volatility, they are particularly effective as antioxidants for materials which, during preparation or use, are subjected to elevated temperatures. Examples of such materials are rubber, both natural and synthetic; such solid polymerized alpha-olefins as polyethylene, polypropylene, ethylene-propylene copolymers, polystyrene, and the like; and lubricants such as motor oils and petroleum-based greases. The esters of the invention are also useful for retarding deterioration of other petroleum materials, such as asphalt and stove oil, and of other synthetic organic resinous materials, such as cellulose acetate, cellulose butyrate, polyethylene terephthalate, polyvinyl acetate, polyvinyl chloride, polyurethanes, polymethyl methacrylate, and the like.

One surprising and advantageous property of the esters of the invention is their resistance to discoloration in polymeric alpha-olefin compositions. It has been observed that with many 3,5-dialkyl-4-hydroxybenzyl-substituted compounds, employed as stabilizers in such compounds as polyethylene or polypropylene, the resulting composition, while possessing excellent thermal and oxidation stability, discolors seriously on heating or on exposure to sunlight or other sources of ultraviolet radiation. Depending on the nature of the stabilizer and substrate, such colors as brown, blue, green and pink are obtained in the course of prolonged irradiation. While the development of such colors does not impair the performance of the polymer, it does render it unsuitable for many consumer applications such as packaging uses, containers, homeware, and the like.

Unexpectedly, it has been found that with the phenyl ester compounds described above, little or no discoloration is obtained. Thus, not only are the esters of the invention superior thermal and oxidation stabilizers in synthetic resins, but they are also comparatively non-discoloring. They are thus particularly well suited for incorporation in light-colored polymeric alpha-olefins as well as other substrates wherein thermal or ultraviolet induced discoloration is a problem. In general, however, esters will afford improved oxidation resistance to organic materials normally subject to oxidative deterioration, whether or not the material is prone to discoloration.

One class of compositions of the type described are those comprising a polymerized alpha-olefin containing a stabilizing amount of the 3,5-dialkyl-4-hydroxybenzyl-substituted phenyl esters of the invention wherein each of the alkyl radicals on said benzyl ring has from 3 to 8 carbon atoms and is branched on the alpha carbon atom. Preferred polymers for the compositions of this invention are those normally solid polymers of alpha-olefins having up to three carbon atoms, e.g., ethylene and propylene, and their copolymers.

The polymers of alpha-olefins stabilized by the compounds of the invention are those normally solid hydrocarbon polymeric materials which are obtained by polymerizing such monoolefins as ethylene, propylene, butene-1, pentene-1, 3-methyl-butene-1, hexene-1, 4-methyl-pentene-1, 4-methyl-hexene-1, 4,4-dimethyl-pentene-1, and the like, as well as their copolymers, e.g., ethylene-propylene copolymers and the like. By "stabilizing amount" is meant an amount of the hydroxybenzyl compound sufficient to stabilize the composition against oxidative, thermal and ultraviolet deterioration, generally from about 0.005% w. to about 1% w. of the total composition.

The polymers are preferably those prepared by low pressure polymerization methods and, accordingly, they may contain trace amounts of metallic catalyst residues, particularly transition metals of Groups IV–VI of the Mendeleeff Periodic Table, and metal residues of a Group I–III metal. For example, many low pressure polymers will contain traces of titanium and aluminum or such other metals as vanadium and zirconium, depending on the particular "Ziegler" catalyst employed in the polymerization. Additionally, the polymers often may contain small amounts of free iron, an impurity which is incorporated in the polymer from the steel apparatus in which the polymerization is conducted.

The polymeric alpha-olefin may be in the form of molding powder, sheets, films, rods, tube, molded forms or the like. Irrespective of the physical form of the polymer, the novel hydroxybenzyl phenyl esters of the invention are useful to impart improved resistance to all forms of embrittlement and degradation.

Typical elastomers in which the substituted benzene compounds of the invention may be employed include natural rubber (*Hevea brasiliensis*) and such synthetic rubberlike elastomers as SBR.

All of these rubbers deteriorate in the presence of oxygen and ozone by hardening, cracking and checking, and thus losing their resiliency and mechanical strength. When these rubbers are processed by milling, curing or molding, they are subjected to high temperatures which tend to volatilize some or all of the stabilizer in the rubber. However, the incorporation into the rubber of the polyphenolic ester compounds of the invention renders the resulting rubber composition resistant to oxidative deterioration during processing, since these novel stabilizers are both heat-stable and relatively non-volatile. As a consequence, the rubber compositions stabilized with these compounds have better retention of color, strength, elasticity and resistance to cracking, checking and tearing than rubber compositions containing less stable antioxidants. The polyphenol esters may thus be added to the rubber at the latex stage during processing on Banbury mills or included with other substances added to the rubber during the course of manufacture.

The esters are also sufficiently soluble in such hydrocarbons as gasoline, fuel oil, and lubricating oils and greases so that they may be incorporated in stabilizing amounts in such materials. Alternatively, they may be employed as inhibitors in such polymerizable liquid ethylenically unsaturated monomers as vinylbenzenes, including styrene, vinyltoluene and divinylbenzene; acrylates, including methyl acrylate, ethyl acrylate and 2-ethylhexyl acrylate; methacrylates, including methyl methacrylate and ethyl methacrylate, and the like, where traces of oxygen in the monomer may initiate undesirable premature polymerization.

In general, in the stabilized compositions containing the novel polyphenolic ester compounds described, only an amount of any particular compound sufficient to stabilize the material against oxidative deterioration will be required. The requisite amount will, of course, depend both on the efficacy of the particular polyphenolic ester compound and on the nature of the normally oxidizable substrate in which it is employed. It has been found that amounts of the stabilizers from about 0.0001% by weight to about 10% by weight, based on the organic substrate, are sufficient. For example, suitable concentrations of the polyphenolic ester compounds in distillate fuels, e.g., kerosene, furnace oil, are on the order of 0.0007% w. to about 0.0028% w., while in rubber somewhat larger amounts, up to about 10% w., are required.

It will be understood that, in addition to containing a stabilizing amount of the polyphenolic ester compounds described, the organic compositions of the invention may contain such other ingredients as other antioxidants, coloring agents, and the like. For example, in rubber or plastic compositions such additives as pigments, fillers, antiozonants and curing agents will be employed, while in fuel compositions such additives as anti-icing agents, dyes, antiknock and antimiss agents and similar conventional ingredients will be found. Lubricants will contain gelling agents, extreme pressure additives and such other materials as are employed in commercial preparations. These additives will not interfere with the superior stabilizing effect of the esters of the invention.

The esters of the invention are also miscible with and impart enhanced stability to natural fats and oils. Typical stabilized compositions containing the benzenes include those wherein the major portion is an edible oil such as menhaden oil, cod liver oil, safflower oil, castor oil, olive oil, sesame oil, peanut oil, babassu oil, palm oil, corn oil or the like. Fats stabilized with the substituted benzenes include oleomargarine, lard, butter, beef tallow, animal fat and hydrogenated vegetable shortening products, such as those sold under such trade names as "Spry," "Crisco," "Snowdrift," and the like.

The following examples will illustrate the novel compositions of the invention. It should be understood, however, that these examples are merely illustrative and are not to be regarded as limitations to the appended claims, since the basic teachings thereof may be varied at will as will be understood by one skilled in the art.

*Examples*

A solution of 10.507 g. of 2,4,6-tris(3,5-di-tert-butyl-4-hydroxybenzyl)phenol and 5 ml. acetic anhydride in 50 ml. pyridine was heated to 55° C. for about one hour, then allowed to cool in a stoppered flask and stand at room temperature.

The contents of the flask were then poured with stirring into 500 ml. water upon which the organic phase separated. The water was decanted and the organic phase was taken up in methylene chloride. The resulting solution was washed with dilute hydrochloric acid, then with water, and then filtered to remove entrained water.

The resulting soltion was evaporated under reduced pressure at 60° C., leaving a crystalline solid residue. The residue was recrystallized from isooctane, and upon analysis was found to be 2,4,6-tris(3,5-di-tert-butyl-4-hydroxybenzyl)phenyl acetate having a melting point of 143.0° C.

In a second preparation, 25 g. of 2,4,6-tris(3,5-di-tert-butyl-4-hydroxybenzyl)phenol were refluxed for about 14 hours with 100 ml. acetic anhydride. Unreacted anhydride was then stripped off under vacuum, and the resulting residue was dissolved in 350 ml. hexane and seeded with crystals of 2,4,6-tris(3,5-di-tert-butyl-4-hydroxybenzyl)phenyl acetate.

The resulting white precipitate was filtered off and washed with additional hexane. In this way, 19.2 g. of 2,4,6-tris(3,5-di-tert-butyl-4-hydroxybenzyl)phenyl acetate was obtained.

Using the same technique, 2,6-di(3,5-diisopropyl-4-hydroxybenzyl)phenyl butyrate is readily prepared from 2,6-di(3,5-diisopropyl-4-hydroxybenzyl)phenol and butyric anhydride.

The esters prepared were evaluated as stabilizers in polypropylene. The samples were prepared by milling the ester into polypropylene for 5 minutes at 190° C. Films of this polypropylene five mils thick, each sample containing a predetermined amount of stabilizer, were maintained in an oven at 133° C. Each sample was tested three times a day for loss of elongation until the film tore readily. The number of days shown in the following table are the total elapsed days before the film tested lost its tensile strength and flexibility.

| Stabilizer | Days to Failure | | Color After Milling |
| --- | --- | --- | --- |
| | 0.10% w. | 0.25% w. | |
| None | <0.5 | <0.5 | White. |
| 2,4,6-tris(3,5-di-tert-butyl-4-hydroxybenzyl)phenol. | 9.5 | 19.5 | Golden yellow. |
| 2,4,6-tris(3,5-di-tert-butyl-4-hydroxybenzyl)phenyl acetate. | 19.5 | 25 | Very pale cream. |

It will be seen from these data that the ester gave substantially better protection and substantially less color to the polypropylene than the unesterified phenol precursor.

Samples of natural rubber containing 0.5% w. of 2,6-di(3,5-diisopropyl-4-hydroxybenzyl)phenyl butyrate are more resistant to accelerated oxidation tests at 150° C. than are unstabilized rubber samples.

I claim as my invention:

1. Polypropylene containing a stabilizing amount of 2,4,6-tris(3,5-di-tert-butyl-4-hydroxybenzyl)phenyl alkanoate, said alkanoate radical having up to 8 carbon atoms.

2. Polypropylene containing a stabilizing amount of 2,4,6 - tris(3,5-di-tert-butyl-4-hydroxybenzyl)phenyl acetate.

3. 2,4,6 - tris(3,5-di-tert-butyl-4-hydroxybenzyl)phenyl alkanoate, said alkanoate radical having up to 8 carbon atoms.

4. 2,4,6 - tris(3,5-di-tert-butyl-4-hydroxybenzyl)phenyl acetate.

References Cited by the Examiner

UNITED STATES PATENTS

| | | | |
| --- | --- | --- | --- |
| 2,807,639 | 9/1957 | Richert | 260—479 |
| 2,822,378 | 2/1958 | Bader | 260—479 |
| 3,053,803 | 9/1962 | Jaffe et al. | 260—45.95 |
| 3,106,570 | 10/1963 | Jaruzelski et al. | 260—479 |
| 3,116,305 | 12/1963 | Morris et al. | 260—45.85 |

FOREIGN PATENTS 558,049   5/1958   Canada.

LEON J. BERCOVITZ, *Primary Examiner.*

G. W. RAUCHFUSS, *Assistant Examiner.*